United States Patent [19]
Armstrong et al.

[11] Patent Number: 5,227,632
[45] Date of Patent: Jul. 13, 1993

[54] OPTICAL RADIATION DETECTOR WITH WIDE FIELD-OF-VIEW

[75] Inventors: Douglas S. Armstrong, Ormond Beach; Dealmus A. Dixon, Daytona Beach, both of Fla.

[73] Assignee: Eltec Instruments, Inc., Daytona Beach, Fla.

[21] Appl. No.: 888,050

[22] Filed: May 22, 1992

[51] Int. Cl.$^5$ .............................................. G01J 5/08
[52] U.S. Cl. ................................... 250/353; 250/342; 250/349; 250/221; 359/840
[58] Field of Search .............. 250/554, 221, 353, 349, 250/342, 216, 578.1; 359/840

[56] References Cited

U.S. PATENT DOCUMENTS

| | | | |
|---|---|---|---|
| 3,226,557 | 12/1965 | Goodman | 250/216 |
| 3,413,468 | 11/1968 | Astheimer | 250/353 |
| 4,375,034 | 2/1983 | Guscott | 250/353 |
| 4,876,445 | 10/1989 | McMaster | 250/221 |
| 5,103,346 | 4/1992 | Chang | 250/221 |

Primary Examiner—Carolyn E. Fields
Attorney, Agent, or Firm—Allen, Dyer, Doppelt, Franjola & Milbrath

[57] ABSTRACT

An optical radiation detector utilizes a unitary V-shaped or conical reflector element located within an internal cavity of an optically transmissive capped housing to provide a 180° cylindrical swath or $2\pi$ steradian hemispherical field-of-view in a compact package. Radiation from a central portion of the field-of-view received into the open top of the reflector is directed by internal reflective surfaces through an apex aperture onto a central sensing element. Radiation from peripheral points of the field-of-view received outside the open top is directed by external reflective surfaces outside the apex aperture onto outer sensing elements. Bandwidth filtering of the sensed radiation is provided either by selection of material for the cap, or by adding an optical filter plate between the reflector and sensing elements. The reflector is attached either to the undersurface of the cap top, or above the filter plate.

19 Claims, 2 Drawing Sheets

OPTICAL RADIATION DETECTOR WITH WIDE FIELD-OF-VIEW

FIELD OF THE INVENTION

This invention relates to an optical radiation detector employing reflective surfaces within the detector to provide wide area of coverage in a compact device.

BACKGROUND OF THE INVENTION

In many applications, it is highly desirable to employ detectors to sense optical radiation throughout an extremely broad field-of-view. Typical examples include the use of electro-optic sensors for detecting motion, or the outbreak of a fire based on changes in infrared radiation levels detected over wide areas of coverage.

The use of internally reflecting truncated cones, pyramidal mirrors, spherical-parabolic surfaces and similar elements for field-of-view expansion and other control purposes is known. Examples of the same are given in U.S. Pat. Nos. 3,413,468; 3,551,676; 4,220,859; 4,778,996; and 4,831,259. The achievement of very wide coverage with available detectors, however requires the use of external lenses and/or reflectors, or the use of multiple detectors in conjunction with lenses and/or mirrors.

SUMMARY OF THE INVENTION

One of the objectives of the present invention is to provide a detector having a wide field-of-view in a low profile, compact arrangement, using reflective elements housed internally within the detector itself.

In accordance with the invention, a compact optical detector has a reflector with inwardly and downwardly converging walls positioned over one or more sensing elements within an optically transmissive cap of a detector housing. The reflector includes an aperture at its apex, and internal reflective surfaces converging toward the apex for directing radiation received from a central portion of the field-of-view, and external reflective surfaces for directing radiation received from peripheral portions of the field-of-view toward the sensing element or elements.

In one embodiment of the invention, described below, a V-shaped foil reflector has converging rectangular internal reflecting surfaces for channeling radiation from the central portion through an apex aperture toward a central one of three laterally-spaced sensing elements. Radiation from peripheral portions is directed by angled rectangular external reflecting surfaces to outer sensing elements located below each reflector side. The cap is of a material that blocks the transmission of radiation of optical frequency outside a desired bandwidth. The coverage is a 180° cylindrical swath field-of-view.

Other embodiments, also described below, utilize inverted, truncated conical or pyramidal reflectors to provide a $2\pi$ steradian hemispherical coverage. The reflector may be attached to depend from the top of the optically transmissive cap, or may be attached to project up from a separate optical filter element positioned directly above the sensors.

The present invention achieves the desired, extremely broad field-of-view in a compact, low profile manner within the detector itself, without the necessity for external elements or the construction of complicated arrangements.

BRIEF DESCRIPTION OF THE DRAWINGS

Embodiments of the invention have been chosen for purposes of illustration and description, and are shown in the accompanying drawings, wherein.

Throughout the drawings, like elements are referred to by like numerals.

DETAILED DESCRIPTION OF PREFERRED EMBODIMENTS

Figure 1:
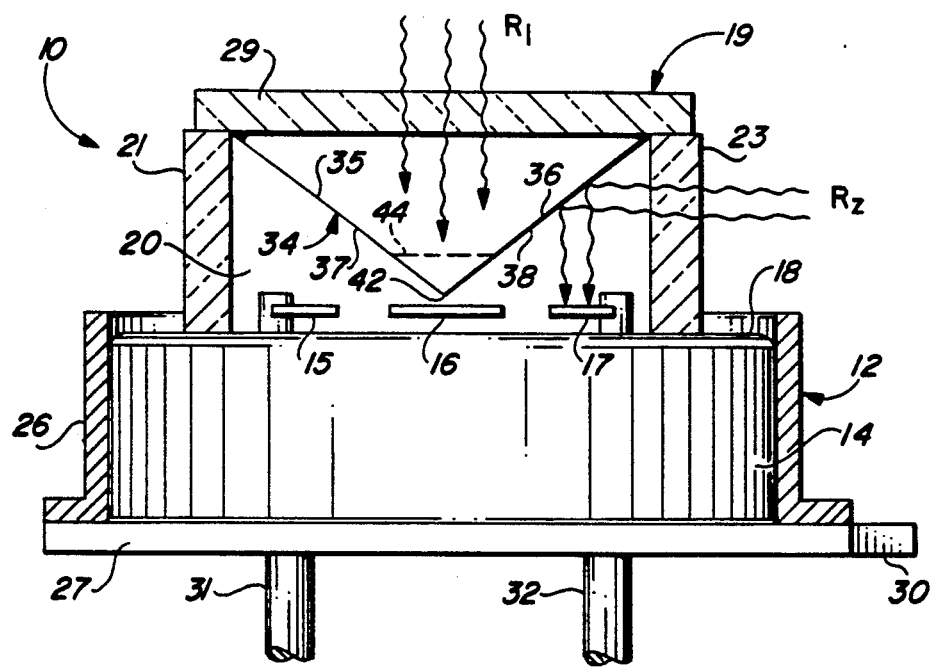
FIG. 1 is a vertical section view, taken along the line 1—1 of FIG. 2, of a detector in accordance with the principles of the invention.
Figure 2:
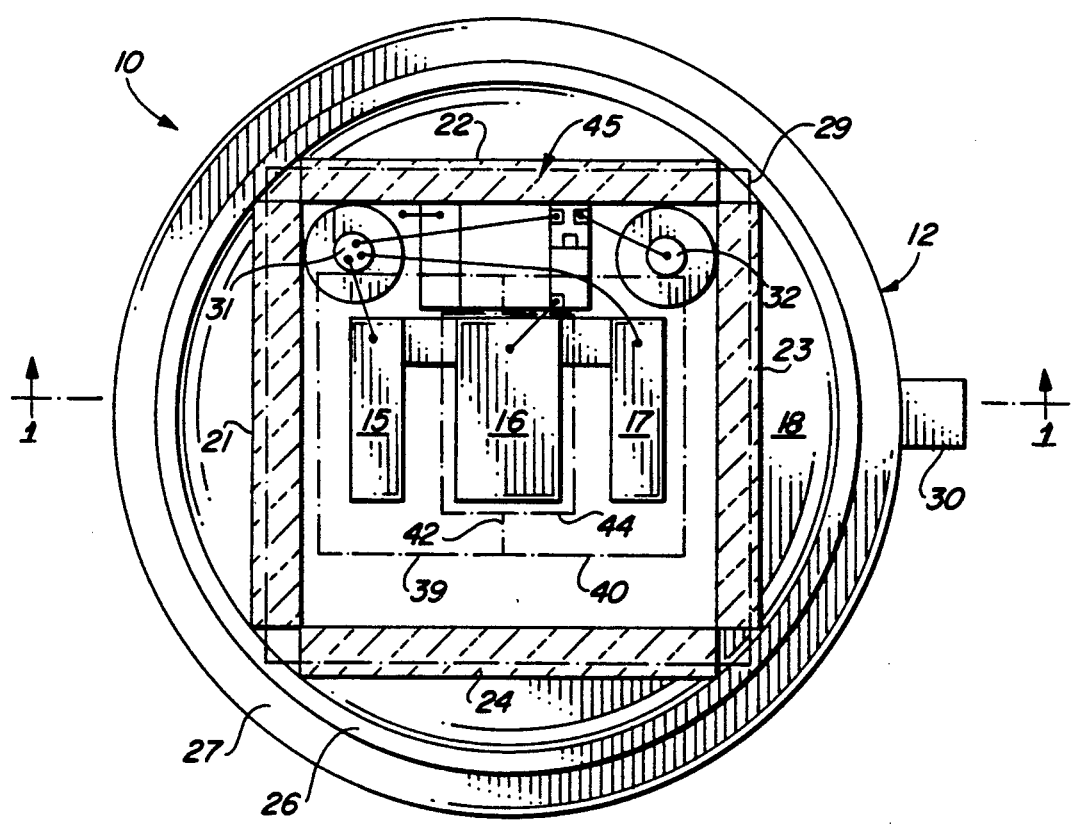
FIG. 2 is a top plan view, with cap top and reflector portions shown in phantom, of the detector of FIG. 1.

A first embodiment 10 of an optical radiation detector in accordance with the invention is shown in FIGS. 1 and 2. The detector 10 comprises a housing 12 including a cylindrical base 14 and one or more sensing elements 15, 16, 17 located above a circular upper surface 18 thereof. A hollow, optical radiation transmissive cap 19 attached peripherally to the surface 18 acts to contain the elements 15, 16, 17 sealed within an internal cavity 20 thereof.

For the illustrated embodiment, the cap 19 has a square horizontal cross-section and is constituted by four rectangular plate elements 21, 22, 23, 24 stood vertically on bottom long edges and arranged in a square atop surface 18 within the confines of a surrounding, protective ring 26 mounted to the annulus of an oversized disk 27 that is arranged coaxially at the bottom of base 14. The top of cap 19 is constituted by a square plate element 29, secured in horizontal position, marginally to the top long edges of the elements 21, 22, 23, 24. A tab 30, projecting radially out from the disk 27, provides an orientation reference; and downwardly projecting terminals 31, 32 provide means for establishing electrical communication between the detector 10 and external circuitry.

In accordance with the invention, a reflector 34, having downwardly-converging sloped internal reflecting surfaces 35, 36 and downwardly sloping external reflecting surfaces 37, 38, is located within the sealed cavity 20, in centered position above the array of sensing elements 15, 16, 17. For the embodiment shown in FIGS. 1 and 2, the reflector 34 comprises a V-shaped reflector having two rectangular sidewalls 39, 40 (shown in phantom in FIG. 2), converging along an apex juncture line 42 interrupted by a horizontal rectangular aperture 44. The sidewalls 39, 40 are identically sized, and identically oppositely angled, with the edges of the walls 39, 40 oriented parallel to respective adjacent planes of the elements 21, 22, 23, 24. The reflector 34 can be conveniently positioned within the cavity 20 by adhesively securing its top edges to marginal positions of the undersurface of the top plate 29. The shown arrangement utilizes three horizontally disposed, rectangular sensing elements 15, 16, 17, laterally-spaced in aligned positions parallel to each other and parallel to the long edges and line of convergence of the walls 39, 40. The sensing element 16 is centrally located in alignment with the aperture 44, and relatively dimensioned, configured and adapted to correspond in size to the size of the opening 44. The sensing elements 15, 17 are generally centrally located below each of the rectangular sidewalls 39, 40. The reflector 34 is preferably of unitary construction, made from foil, metal coated plastic or other suitable reflective material.

Detection circuitry 45, comprising conventional hybrid or monolithic electronics circuitry, is located on the base 14 for processing signals received by the sensing elements 15, 16, 17, and generating an output at the terminals 31, 32 corresponding to variations in the detected radiation. Elements 15, 16, 17 are preferably of pyroelectric material such as lithium tantalate, connected in known ways with integral voltage mode or current mode electronics. When more than one element 15, 16, 17 is utilized, as shown, the elements can be connected in series or parallel opposition or addition. The particular configuration and connection of sensing elements and circuitry is varied to suit individual needs and preferences.

The reflector 34 is open at its top and bottom apex ends, and is optically reflective on both inner 35, 36 and outer 37, 38 surfaces. The cap 19 of detector 10 may advantageously be chosen to be of a material which is transmissive only to optical radiation having wavelength or frequency falling with a desired bandwidth. Useful materials for this purpose include silicon, germanium, infrared transmissive glass, polyethylene, and other similar substances. Cap 19 may have the five-sided (four sides 21, 22, 23, 24 and a top 29) box configuration shown, or may just as well comprise a capped cylinder, a dome or other appropriate hollowed shape.

Figure 5A:
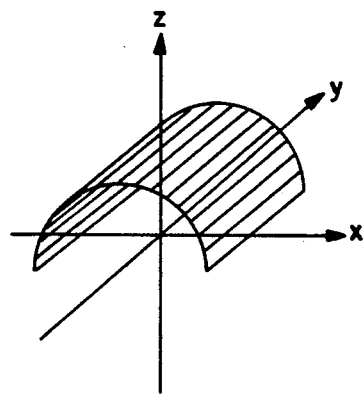
FIGS. 5A and 5B are graphical representations of the fields-of-view achieved, respectively, by the first and second embodiments of the invention.

In operation, optical radiation $R_1$, from a central portion of a wide field-of-view will be channeled toward the aperture 44 and central sensing element 16 by the internal reflecting surfaces 35, 36 of the reflector 34, as shown in FIG. 1. Radiation $R_2$, directed from peripheral portions of the same wide field-of-view, will be directed to the outer sensing elements 15, 17 by reflection off the external reflecting surfaces 37, 38. With the V-shaped reflector configuration of FIGS. 1 and 2, the detector 10 will have a 180° cylindrical swath field-of-view, as graphically represented in FIG. 5A. A detector 10 mounted with its base 14 in alignment with the X-Y plane, and its reflector apex line 42 aligned with the Y axis, will see a 180° field-of-view in the X-Z plane. The field-of-view in the Y-Z plane will be less than 180°, limited by the dimensions of the central sensing element 16 and by the vertical spacing between the element 16 and the aperture 44.

Figure 3:
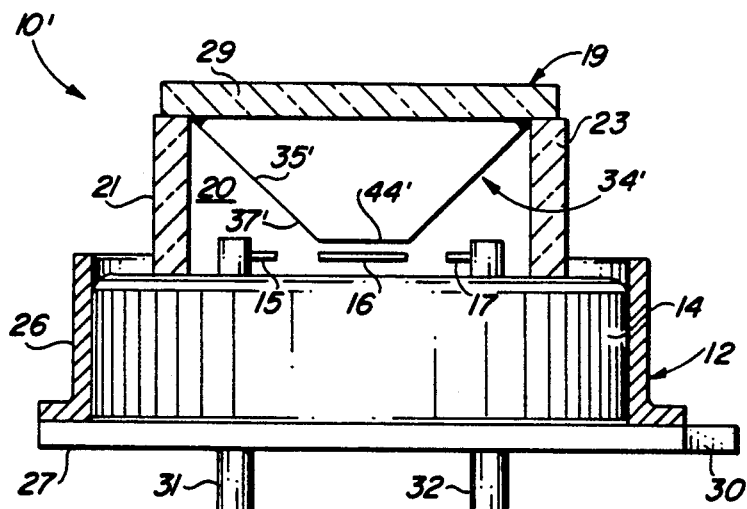
FIG. 3 is a view as in FIG. 1 of a detector in accordance with a second embodiment of the invention.
Figure 5B:
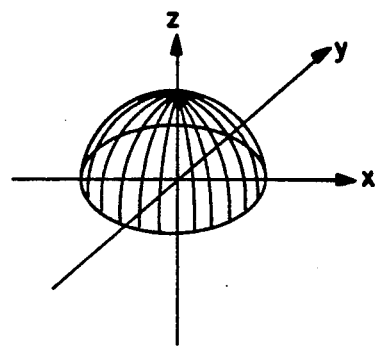

FIG. 3 shows a second embodiment 10' of the detector 10. In this configuration, the reflector 34 has been replaced by a reflector in the form of an inverted, truncated cone 34', open at top and bottom ends, and having walls of circular horizontal cross-section, converging downwardly toward a central circular aperture 44'. The cone is coaxially aligned with the cylindrical base 14 of the housing 12, with the opening 44' located slightly above and dimensioned, configured and adapted to match the size of the central sensing element 16. The circular top edge of the inverted cone 34' is adhesively secured to the undersurface of the top 29 of the square cross-sectioned cap 19. The conical inner reflective surface 35' serves to direct radiation from the central portion of the field-of-view of detector 10' toward the sensing element 16 through the aperture 44'. The reflective outer surface 37' of the conical reflector 34' serves to direct radiation from the peripheral region of the field-of-view of detector 10' toward the outer sensing elements 15, 17. For the shown configuration, the field-of-view of detector 10' is hemispheric, as seen in FIG. 5B. A detector 10' mounted with its base 14 in alignment with the X-Y plane, will see a $2\pi$ steradian field-of-view having a field-of-view angle of 180° in both the X-Z and Y-Z planes.

Figure 4:
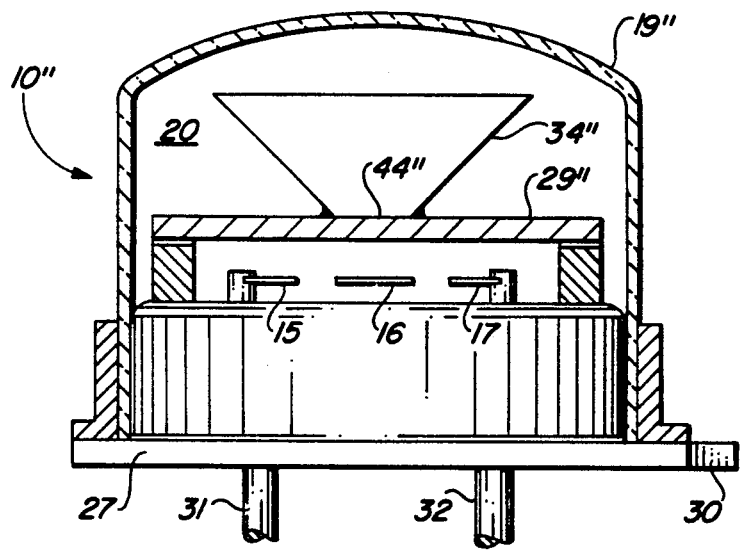
FIG. 4 is a view as in FIG. 3 of a modified form of the second embodiment.

FIG. 4 shows a modified form 10''' of the second embodiment 10' of the detector. In this configuration, the internal reflector 34'' (either V-shaped or conical) is mounted within the cavity 20, prior to optical bandpath filtering in the optical path. As shown, a square plate 29'' of optical filtering material, transmissive only to radiation falling within the desired bandwidth, is located horizontally between the apex 44'' of reflector 34'' and the sensing elements 15, 16, 17. This eliminates the requirement that the outer cap 19'' (shown as dome-shaped in FIG. 4) be made of a material which is transmissive only at the desired optical bandwidth. This frees the cap up from construction limitations, and affording ease and flexibility in tailoring the optical bandwidth filtering by, e.g., permitting rapid exchange of one filter element 29'' for another. For the illustrated detector 10'', the reflector 34'' is adhesively mounted circumferentially of its aperture 44' to the plate 29'', not at its upper opening to cap 19''.

The reflector may be a simple conical shell, inverted pyramid (three or more sides with no base or top), truncated hyperboloid, or any other suitably shaped optical radiation funnel. The key consideration is that it be proportioned and positioned relative to the sensing elements, such that optical radiation striking the inner surface will be reflected (directly or by multiple reflections) down through the apex aperture to the appropriate sensing element, and that optical radiation striking the outer surface be likewise reflected down to a sensing element. Further, the inner and outer surfaces do not necessarily have to be positive and negative images of each other. With modern casting, forming and coating technologies, the inner surface could, for example, be purely conical while the outer surface could be that of a truncated elliptic paraboloid. If desired, prismatic grooves can be pressed or cut into the sides of the optically transmissive cap, so that the walls of the cap itself present one or more fresnel lenses which cooperate with the reflective surfaces of the reflector to direct the radiation toward the sensing elements.

The invention, as shown and described, provides a low profile, compact detector with wide field-of-view area coverage. One application of the described detector would be as a sensor of longwave infrared radiation emitted by people, for the purpose of activating an intrusion alarm or for detecting human presence in order to control lights or air-conditioning. A detector in accordance with the invention can effectively provide complete coverage of a typical room space in a small, unobtrusive, aesthetically pleasing package. Another application would be as a flame sensor in computer rooms and hospitals. For example, the cap or filter plate could be coated or constituted by a material that limits optical transmission to 4.3 micrometer wavelength radiation. This would give an advantage over conventional smoke detectors which cannot respond quickly enough to explosions or rapidly escalating fires. A detector in accordance with the present invention also lends itself well to being a "mother" detector to a bundle of optical fibers especially in applications involving the detection or transmission of longwave infrared radiation frequencies.

Those skilled in the art to which the invention relates will appreciate that other substitutions and modifications can be made to the described embodiment without departing from the spirit and scope of the invention as described by the claims below.

What is claimed is:

1. An optical radiation detector having a wide field-of-view, said detector comprising:
   a housing having a base and an optically transmissive cap mounted on said base to define a sealed cavity between said cap and said base;
   at least one sensing element mounted on said housing, within said cavity; and
   a reflector having upper and lower open ends, and walls converging downwardly and inwardly from said upper to said lower ends, and including internal and external reflective surfaces;
   said reflector being mounted on said housing within said cavity and relative to said at least one sensing element, and said reflective surfaces being dimensioned, configured and adapted, so that said internal reflective surfaces will direct radiation received through said cap into said upper end from a central portion of said field-of-view, into said lower end and onto said at least one sensing element, and so that said external reflective surfaces will direct radiation received through said cap outside of said upper end from a peripheral portion of said field-of-view outside of said lower end onto said at least one sensing element;
   said detector further having electronic. circuitry located within said housing and connected to said at least one sensing element for generating an electrical output signal representative of said radiation received from said central and peripheral portions onto said at least one sensing element; and
   terminals located on said housing and connected to said electronic circuitry for accessing said electrical output signal from outside said housing.

2. A detector as in claim 1, wherein said cap comprises a material that is transmissive only to optical radiation of a frequency falling within a predefined bandwidth.

3. A detector as in claim 1, wherein said cap includes a top, and wherein said reflector is attached at said upper end to said cap top.

4. A detector as in claim 1, wherein said detector further comprises an optical filter positioned in said cavity between said reflector and said at least one sensing element; said filter being transmissive only to optical radiation of a frequency falling within a predefined bandwidth.

5. A detector as in claim 4, wherein said reflector is attached at said lower end to said filter.

6. A detector as in claim 1, wherein said reflector is a V-shaped reflector comprised of two rectangular sidewalls converging along an apex juncture line, interrupted by a rectangular aperture forming said lower open end; said reflector being dimensioned, configured and positioned to provide said detector with a 180° cylindrical swath field-of-view.

7. A detector as in claim 6, wherein said at least one sensing element comprises a central and two outer sensing elements, said central sensing element being located below said rectangular aperture, and said outer sensing elements being respectively located one below each sidewall.

8. A detector as in claim 1, wherein said reflector has an inverted, truncated funnel shape dimensioned, configured and adapted to provide said detector with a hemispherical field-of-view.

9. An optical radiation detector having a 180° cylindrical swath field-of-view, said detector comprising:
   a housing having a base and an optically transmissive cap mounted on said base to define a sealed cavity between said cap and said base;
   first, second and third sensing elements mounted in laterally-spaced positions on said housing, within said cavity; and
   a V-shaped reflector having first and second rectangular sidewalls converging along an apex juncture line interrupted by a rectangular aperture; said converging sidewalls providing facing reflective surfaces and non-facing reflective surfaces;
   said reflector being mounted on said housing within said cavity and relative to said sensing elements, and said reflective surfaces being dimensioned, configured and adapted, so that said second sensing element is located below said aperture, said first and third sensing elements are respectively located below said first and second sidewalls, radiation received through said cap and between said sidewalls from a central portion of said field-of-view will be directed by said facing surfaces into said aperture and onto said second sensing element, and radiation received through said cap outside of said sidewalls from a peripheral portion of said field-of-view will be directed by said non-facing surfaces outside of said aperture onto said first and third sensing elements;
   said detector further having electronic circuitry located within said housing and connected to said sensing elements for generating an electrical output signal representative of said radiation received from said central and peripheral portions; and
   terminals located on said housing and connected to said electronic circuitry for accessing said electrical output signal from outside said housing.

10. A detector as in claim 9, wherein said cap comprises an open box, including four rectangular side plates attached at bottom long edges to said base and a rectangular top plate secured in horizontal position, marginally to top long edges of said side plates.

11. A detector as in claim 10, wherein the reflector is attached by said sidewalls to said top plate.

12. A detector as in claim 11, wherein said side and top plates of said cap comprise material which is transmissive only to optical radiation of a frequency falling within a predefined bandwidth.

13. An optical radiation detector having a $2\pi$ steradian hemispherical field-of-view, said detector comprising:
   a housing having a base and an optically transmissive cap mounted on said base to define a sealed cavity between said cap and said base;
   first, second and third sensing elements mounted in laterally-spaced positions on said housing, within said cavity; and
   a conical reflector having open top and bottom ends and conical sidewalls defining internal and external reflective surfaces;
   said reflector being mounted on said housing within said cavity and relative to said sensing elements, and said reflective surfaces being dimensioned, configured and adapted, so that said second sensing element is located below said bottom end, said first and third sensing elements are respectively located below said external reflective surfaces of said sidewalls, radiation received through said cap into said top end from a central portion of said field-of-view will be directed by said internal reflective surfaces into said bottom end and onto said second sensing element, radiation received through said cap outside of said top end from a peripheral portion of said field-of-view will be directed by said external reflective surfaces outside of said bottom end onto said first and third sensing elements;

said detector further having electronic circuitry located within said housing and connected to said at least one sensing element for generating an electrical output signal representative of said radiation received from said central and peripheral portions; and terminals located on said housing and connected to said electronic circuitry for accessing said electrical output signal from outside said housing.

14. A detector as in claim 13, wherein said cap comprises an open box, including four rectangular side plates attached at bottom long edges to said base and a rectangular top plate secured in horizontal position, marginally to top long edges of said side plates.

15. A detector as in claim 14, wherein the reflector is attached by said sidewalls to said top plate.

16. A detector as in claim 15, wherein said side and top plates of said cap comprise material which is transmissive only to optical radiation of a frequency falling within a predefined bandwidth.

17. A detector as in claim 13, wherein said detector further comprises an optical filter plate positioned horizontally in said cavity, between said reflector and said sensing elements; said filter plate being transmissive only to optical radiation of a frequency falling within a predefined bandwidth.

18. A detector as in claim 17, wherein said reflector is attached at said bottom end to said filter plate.

19. A detector as in claim 18, wherein said cap is dome-shaped.

* * * * *